US012776641B2

(12) United States Patent
Hua et al.

(10) Patent No.: US 12,776,641 B2
(45) Date of Patent: Oct. 27, 2026

(54) SYSTEM AND METHOD OF PROTECTING HIGH VOLTAGE CIRCUITS FROM HIGH ENERGY ELECTRICAL OVERSTRESS EVENTS

(71) Applicant: Semtech Corporation, Camarillo, CA (US)

(72) Inventors: Lei Hua, Camarillo, CA (US); William Allen Russell, Camarillo, CA (US); Pengcheng Han, Calabasas, CA (US); Changjun Huang, Oak Park, CA (US)

(73) Assignee: SEMTECH CORPORATION, Camarillo, CA (US)

( * ) Notice: Subject to any disclaimer, the term of this patent is extended or adjusted under 35 U.S.C. 154(b) by 157 days.

(21) Appl. No.: 18/781,053

(22) Filed: Jul. 23, 2024

(65) Prior Publication Data

US 2025/0357745 A1 Nov. 20, 2025

Related U.S. Application Data

(60) Provisional application No. 63/648,970, filed on May 17, 2024.

(51) Int. Cl.
*H02H 3/00* (2006.01)
*H02H 3/20* (2006.01)
*H02H 9/04* (2006.01)

(52) U.S. Cl.
CPC ................ *H02H 3/20* (2013.01); *H02H 9/04* (2013.01)

(58) Field of Classification Search
CPC ........................................................ H02H 3/20
See application file for complete search history.

(56) References Cited

U.S. PATENT DOCUMENTS

| | | | | |
|---|---|---|---|---|
| 7,843,673 | B2 | 11/2010 | Ng et al. | |
| 8,106,617 | B1 * | 1/2012 | Holley ............... | G05B 19/4062 318/599 |
| 8,107,208 | B2 | 1/2012 | Hotchkiss et al. | |
| 8,643,988 | B1 | 2/2014 | Kwong | |
| 9,001,485 | B2 | 4/2015 | Nozoe et al. | |
| 9,906,015 | B2 * | 2/2018 | Hayashi ................. | H02H 3/087 |
| 10,868,421 | B2 | 12/2020 | Peng et al. | |
| 11,942,780 | B2 | 3/2024 | Rupp et al. | |

(Continued)

FOREIGN PATENT DOCUMENTS

| | | |
|---|---|---|
| CN | 106449634 A | 9/2016 |
| EP | 4071812 | 10/2022 |

OTHER PUBLICATIONS

Notification of Transmittal of the International Search Report and The Written Opinion of the International Search Authority—The European Patent Office—mailed Aug. 1, 2025, for PCT/US25/25139, 17 pages.

*Primary Examiner* — Stephen W Jackson
(74) *Attorney, Agent, or Firm* — Jackson Walker LLP; Christopher J. Rourk

(57) ABSTRACT

A voltage protection circuit is disclosed that includes a programmable reference voltage circuit configured to receive an input voltage and to generate a reference voltage. An error amplifier stage is coupled to the programmable reference voltage circuit. A voltage limiting circuit is coupled to the programmable reference voltage circuit and the error amplifier stage. A voltage clamping element is coupled to the programmable reference voltage circuit, the error amplifier stage and the voltage limiting circuit.

20 Claims, 10 Drawing Sheets

(56) References Cited

U.S. PATENT DOCUMENTS

| | | | | |
|---|---|---|---|---|
| 2007/0086141 | A1 | 4/2007 | Elms | |
| 2008/0019071 | A1 | 1/2008 | Hansen et al. | |
| 2008/0232006 | A1 | 9/2008 | Ramirez et al. | |
| 2009/0323242 | A1 | 12/2009 | Shibayama et al. | |
| 2011/0304940 | A1* | 12/2011 | Cao | H02H 9/046<br>361/56 |
| 2012/0112872 | A1 | 5/2012 | Kang et al. | |
| 2016/0126727 | A1 | 5/2016 | Wang et al. | |
| 2018/0024356 | A1* | 1/2018 | Yamakawa | G02B 26/10<br>345/7 |
| 2022/0224109 | A1 | 7/2022 | Lai et al. | |
| 2024/0071704 | A1* | 2/2024 | Rodrigues | H02H 3/006 |

* cited by examiner

SYSTEM AND METHOD OF PROTECTING HIGH VOLTAGE CIRCUITS FROM HIGH ENERGY ELECTRICAL OVERSTRESS EVENTS

RELATED APPLICATIONS

The present application claims priority to and benefit of U.S. Provisional Patent application 63/648,970, filed May 17, 2024, which is hereby incorporated by reference for all purposes as if set forth herein in its entirety.

TECHNICAL FIELD

The present disclosure relates generally to electrical devices, and more specifically to systems and methods of protecting high voltage circuits from high energy electrical overstress (EOS) events.

BACKGROUND OF THE INVENTION

Electrical overstress events can damage circuits.

SUMMARY OF THE INVENTION

A voltage protection circuit is disclosed that includes a programmable reference voltage circuit configured to receive an input voltage and to generate a reference voltage. An error amplifier stage is coupled to the programmable reference voltage circuit. A voltage limiting circuit is coupled to the programmable reference voltage circuit and the error amplifier stage. A voltage clamping element is coupled to the programmable reference voltage circuit, the error amplifier stage and the voltage limiting circuit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
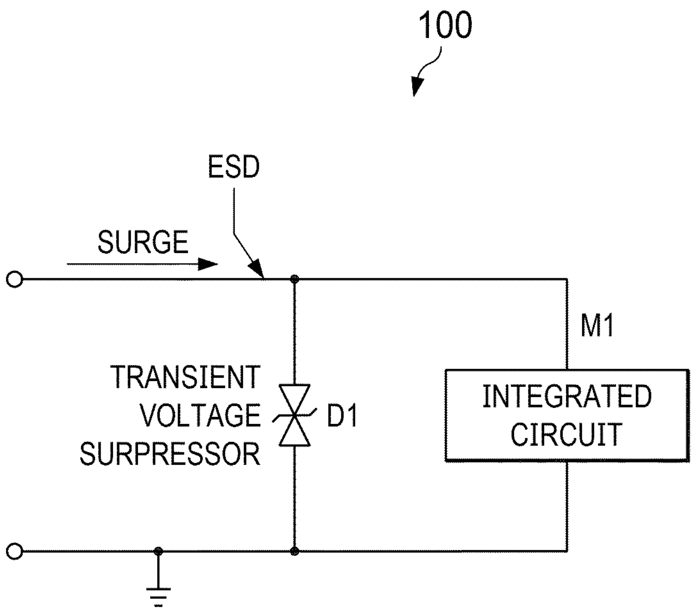
FIG. 1 is a diagram of a circuit for transient voltage suppression, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present application claims priority to and benefit of U.S. Provisional Patent application 63/648,970, filed May 17, 2024, which is hereby incorporated by reference for all purposes as if set forth herein in its entirety.

FIG. 1 is a diagram of a circuit 100 for transient voltage suppression, in accordance with an example embodiment of the present disclosure. Transient voltage suppressors (TVS) (shown as a diode D1, but D1 is a symbolic place holder for a suitable inventive TVS as disclosed and described herein in place of D1) can be used to protect integrated circuits M1 from electrostatic overstress (EOS) and electrostatic discharge (ESD) events, such as a lightning-related surge overvoltage.

As shown in circuit 100, D1 is the external TVS protecting integrated circuit M1 from damages caused by either a power surge or by an EOS or ESD event.

Figure 2:
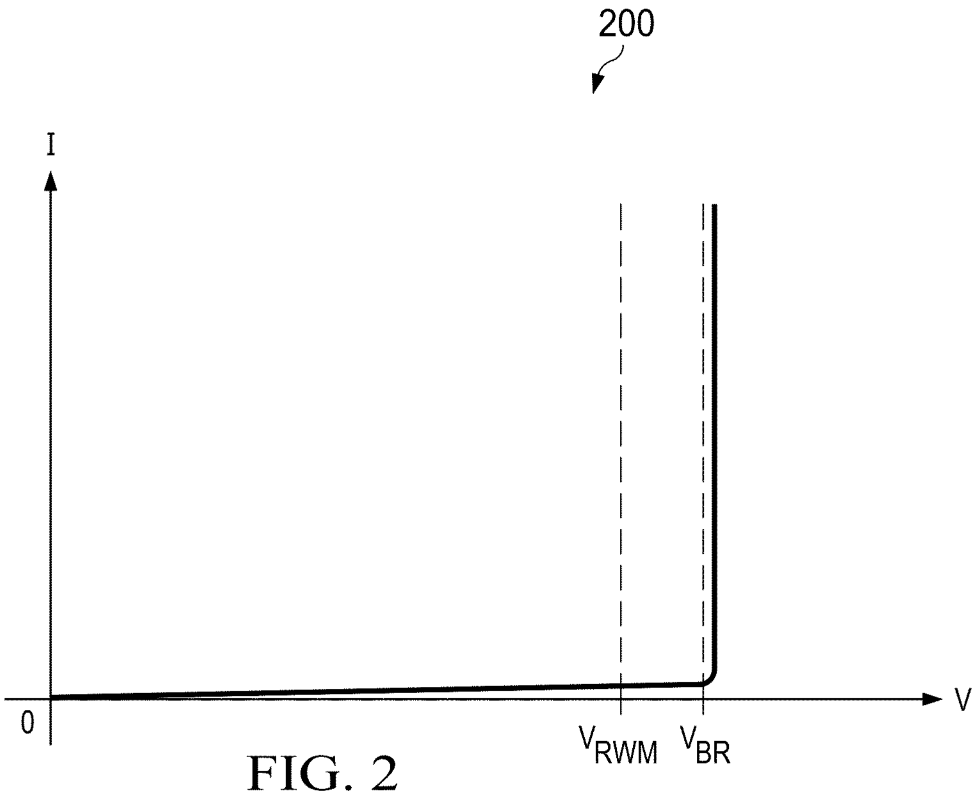
FIG. 2 is a diagram of current-voltage characteristics of a TVS with no fold-back characteristics, in accordance with an example embodiment of the present disclosure.

FIG. 2 is a diagram 200 of current-voltage characteristics of a TVS with no fold-back characteristics, in accordance with an example embodiment of the present disclosure. The first voltage metric VBR is the break down voltage, and is referred to herein in regards to the disclosed example embodiments of the inventive TVS. The second voltage metric $V_{RWM}$ is the maximum reverse working voltage allowed on the disclosed example embodiments of the inventive TVS.

Figure 3:
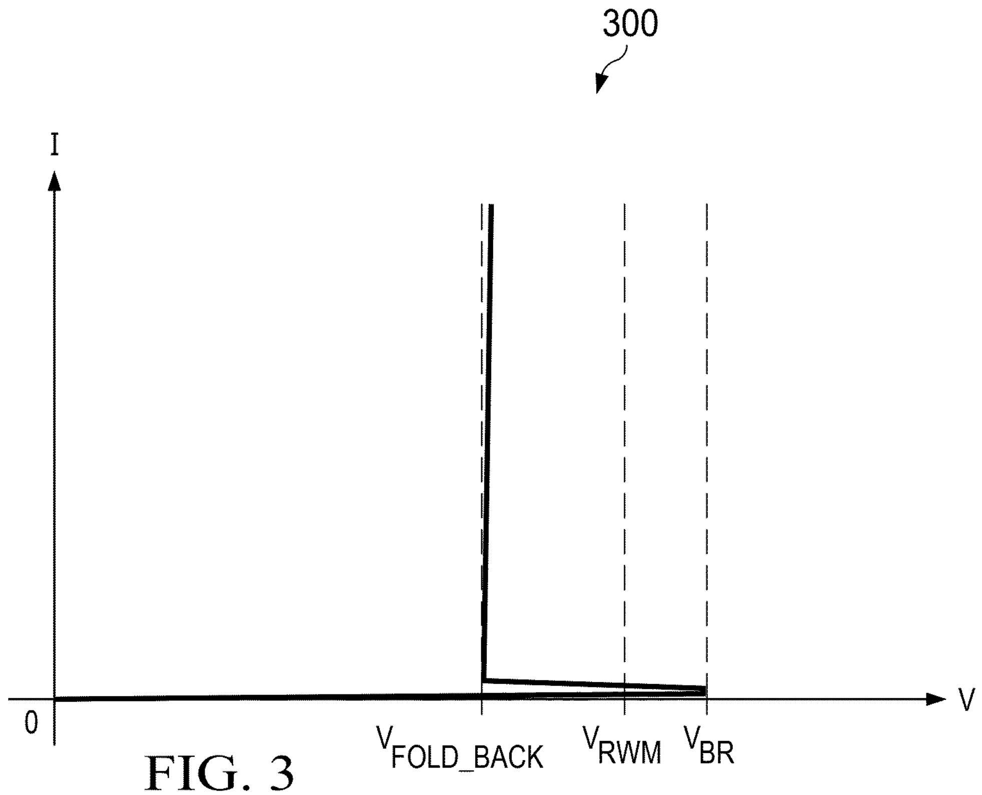
FIG. 3 is a diagram of a current-voltage characteristics of a TVS with fold-back, in accordance with an example embodiment of the present disclosure.

FIG. 3 is a diagram 300 of current-voltage characteristics of a TVS with fold-back, in accordance with an example embodiment of the present disclosure. The metric $V_{SNAP\text{-}\_BACK}$ is the voltage on the TVS when fold-back happens. When the TVS has low dynamic resistance, the clamping characteristics on the TVS is determined by its fold-back voltage when EOS events happen. The metric $V_{FOLD\text{-}BACK}$ is fixed and determined by the design. The end user might not be able to optimize the clamping performance for different working voltages.

Figure 4:
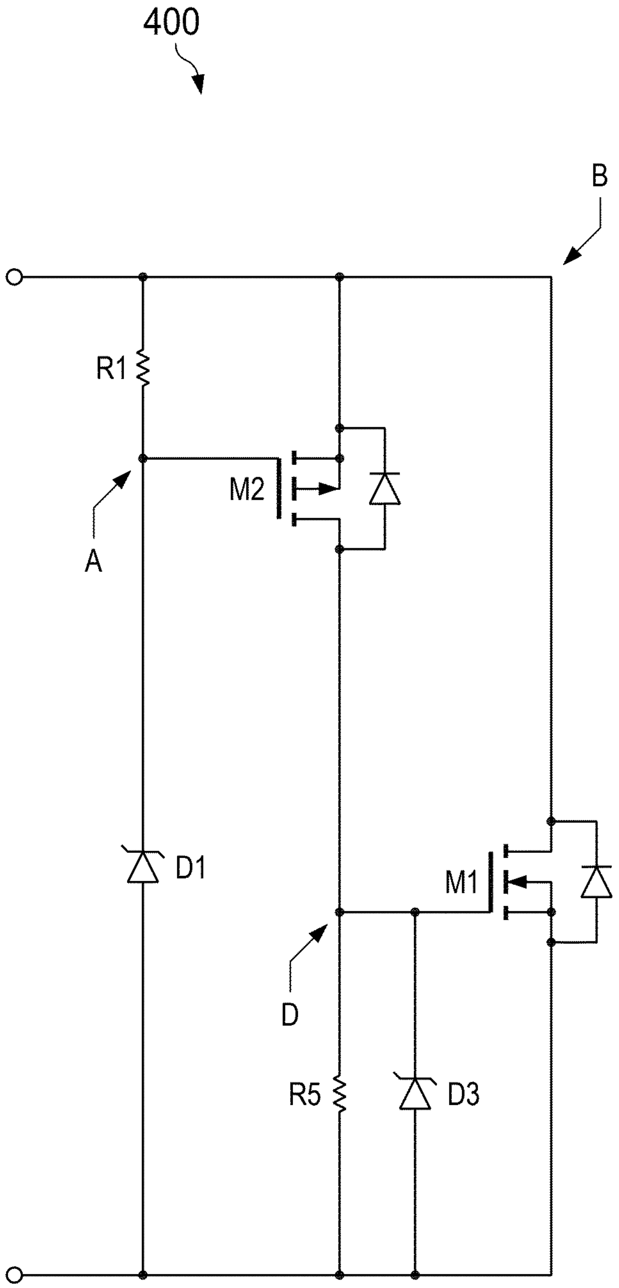
FIG. 4 is a diagram of a circuit, in accordance with an example embodiment of the present disclosure.

FIG. 4 is a diagram of a circuit 400, in accordance with an example embodiment of the present disclosure. Circuit

400 includes n-channel power MOSFET (nFET) M1 and p-channel MOSFET (pFET) M2 driving M1 when the voltage drop across resistor R1 exceeds the turn-on threshold of pFET M2. Zener diode D1 has a rated voltage and determines the maximum allowed working voltage on the protection device. Resistor R5 is the gate resistance on nFET M1, and D3 protects the gate voltage of nFET M1 from exceeding 5V.

The working mechanism of this protection device is provided when the voltage across Zener diode D1 is below the rating voltage and the protection device is in off state. In this state, the gate of nFET M1 is grounded. When the input voltage exceeds the rating voltage of Zener diode D1 to a certain level, the voltage drop across resistor R1 is high enough so that pFET M2 turns on. When pFET M2 turns on, the gate of nFET M1 pulls up high, and nFET M1 is fully turned on shunting the surge current to ground to protect the integrated circuit.

As can be seen from the description above, the DC I-V curve of circuit 400 is similar to diagram 200. The rating voltage of Zener diode D1 is like VBR and determines the clamping voltage, which is fixed.

Figure 5:
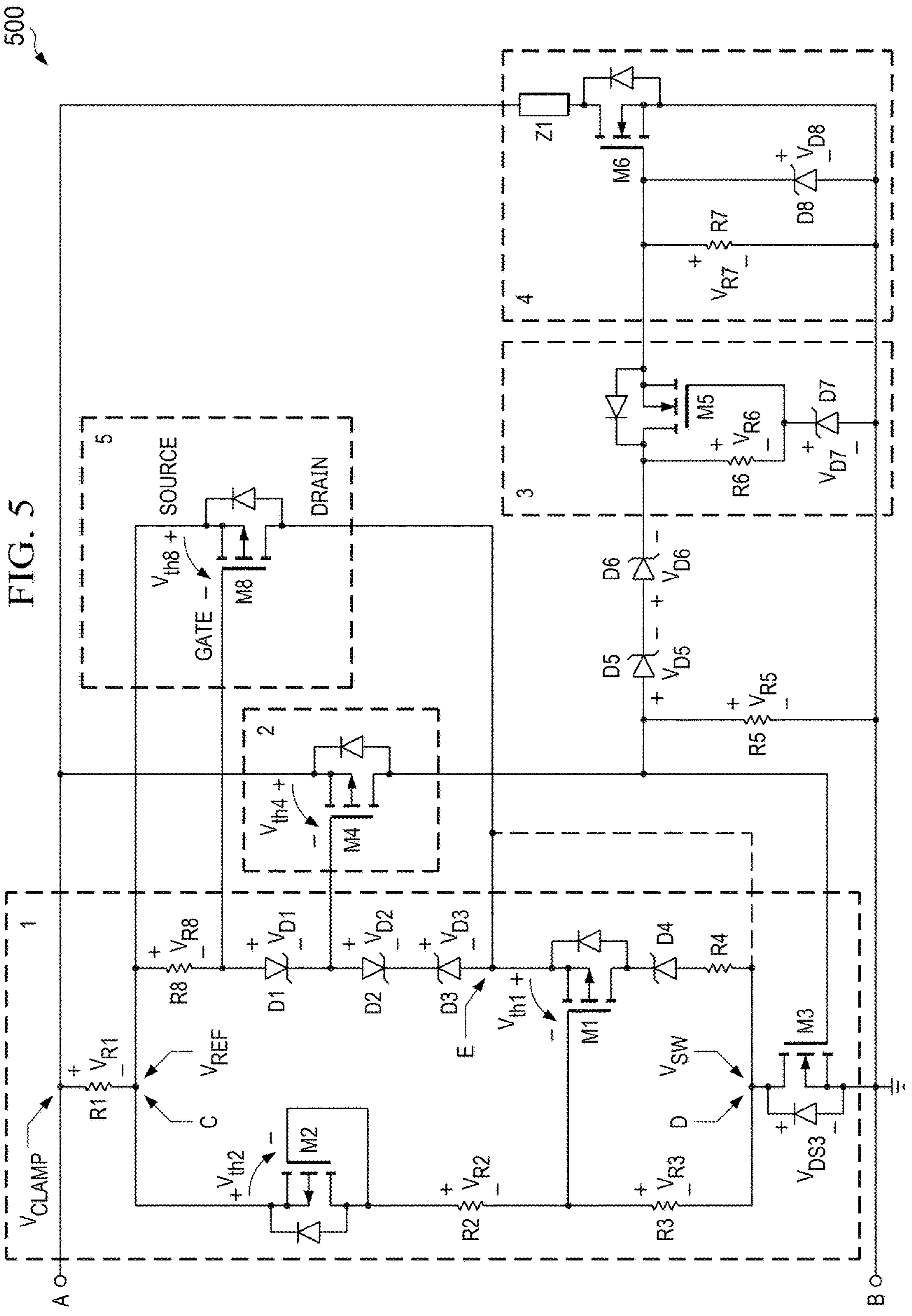
FIG. 5 is a diagram of a circuit for a protection device that uses a pFET to generate a reference voltage and a small nFET at the bottom, in accordance with an example embodiment of the present disclosure.

FIG. 5 is a diagram of a circuit 500 for a protection device that uses a pFET to generate a reference voltage and a small nFET at the bottom, in accordance with an example embodiment of the present disclosure. Circuit 500 can be used to provide a snap-back function, to get the similar I-V performance as shown in diagram 300.

The input to circuit 500 is shown as A and the ground return is point B, with five functional blocks:

1) The first block is a programmable reference voltage circuit.
2) The second block is a trans-conductance error amplifier stage to convert an error voltage into current to drive clamping element nFET M6.
3) The third block is a voltage limiting circuit to limit the maximum gate voltage on nFET M6.
4) The fourth block is a voltage clamping element using nFET M6 to bypass the surge current to ground during transient events, such as a lightning-induced surge.
5) The fifth block is a bypassing element that uses pFET M8 to bypass an initial current spike flowing through Zener diode D3 and forward diode D2. The drain of pFET M8 can be connected to point D or point E for the current spike to flow back into the circuit.

Circuit 500 provides a programmable reference voltage generating circuit. When circuit 500 is attached onto the VBUS line, the voltage across A and B is stable and fixed. Thus, nFET M3 is in an off-state, and the circuit elements above nFET M3 and nFET M6 are also in an off-state. There is very little leakage current flowing through the device.

When there is a surge event happening on the device from point A to point B, since there is parasitic capacitance from the drain to source on nFET M3, $V_{DS3}$ will stay the same as before until the its Cos gets charged up. If the values of resistor R2 and resistor R3 are large, it will take a long time to get capacitance $C_{DS}$ of nFET M3 charged up. In other words, the voltage slew rate on $C_{DS}$ of nFET M3 at the beginning of the surge events will be less than the slew rate of the surge voltage happening between the point A and the point B. Thus, the voltage differential will develop from point C to point D. When the voltage $V_{R1}+V_{D1}$ is higher than $V_{th4}$, pFET M4 turns on starting to pump out current flowing through resistor R5. The voltage drop on resistor R8 will be too small, so it is ignored in this analysis. If pFET M4 is sized correctly and resistor R5 has a high value, $V_{R5}$ can easily exceed the turn-on threshold of the nFET M3, quickly starting to pull the potential of point D to ground. This driving mechanism happening on nFET M3 ensures that $V_{R1}+V_{D1}$ stays above $V_{th4}$, locking pFET M4 in on-state so that pFET M4 keeps pumping out current towards resistor R5.

pFET M8 can bypass the extra current spike that flows through Zener diode D3 and forward diode D2 to ensure the current flowing through Zener diode D3 and forward diode D2 is limited so that the voltage drop generated $V_{D3}+V_{D2}$ does not fluctuate too much. The drain of pFET M8 can be tied to point E or point D. The purpose of combining forward diode D2 and Zener diode D3 together is that $V_{D3}$ has a positive temperature coefficient and $V_{D2}$ has a negative temperature coefficient, such that the sum of the two can be more stable over temperatures.

When $V_{R5}$ goes above the sum of $V_{D5}+V_{D6}$, then $V_{R7}$ starts to build up. When $V_{R7}$ exceeds the turn-on threshold of nFET M6, M6 turns on and starts to shunt the surge current to ground so that the potential on point A gets clamped to the programmed clamping voltage as addressed in Equation (1). $V_{DS3}$ is very small and is being omitted in Equation (1) since nFET M3 is on state.

$$V_{Clamp} = \frac{R_2 + R_3}{R_2} \times (V_{D1} + V_{D2} + V_{D3} + V_{th1} - V_{th2}) + V_{th2} + V_{th4} - V_{D1} \quad (1)$$

As shown in Equation (1), $V_{Clamp}$ can be programmed by varying the values of resistor R2 and resistor R3 to get the optimized clamping voltage. nFET M5 plus resistor R6 and Zener diode D7 form a voltage limiting circuit that limits the maximum gate voltage applied on nFET M6 and protects nFET M6 from getting damaged during a surge event that is over the design specifications. nFET M6 in series with impedance Z1 shunt the surge current to the group. Impedance Z1 can be other suitable semiconductor devices such as a Zener diode, varistors, metal oxide varistors (MOVs) or resistors. Impedance Z1 shares the voltage stress on nFET M6 and helps to spread the heat generated from nFET M6.

Figure 6:
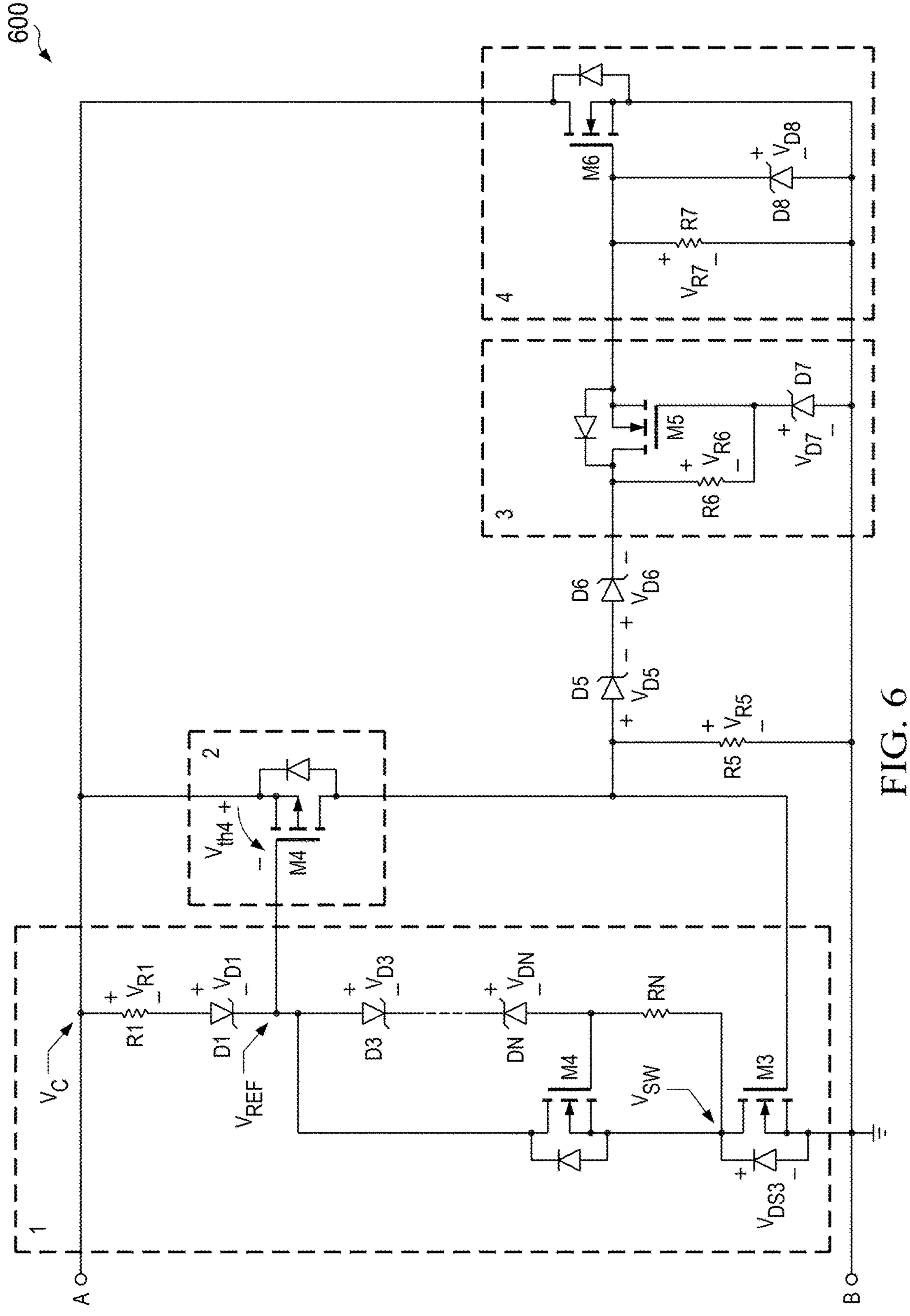
FIG. 6 is a diagram of a circuit using a regular Zener string with shunt a nFET, in accordance with an example embodiment of the present disclosure.

FIG. 6 is a diagram of a circuit 600 using a regular Zener string with a shunt nFET, in accordance with an example embodiment of the present disclosure. Circuit 600 includes the first four functional blocks and omits the fifth functional block of the bypassing element. The first block is a programmable reference voltage circuit with a different configuration from the first block of circuit 500. The second block and the third block have a configuration similar to the corresponding blocks of circuit 500. The fourth block is a voltage clamping element that omits Z1.

Figure 7:
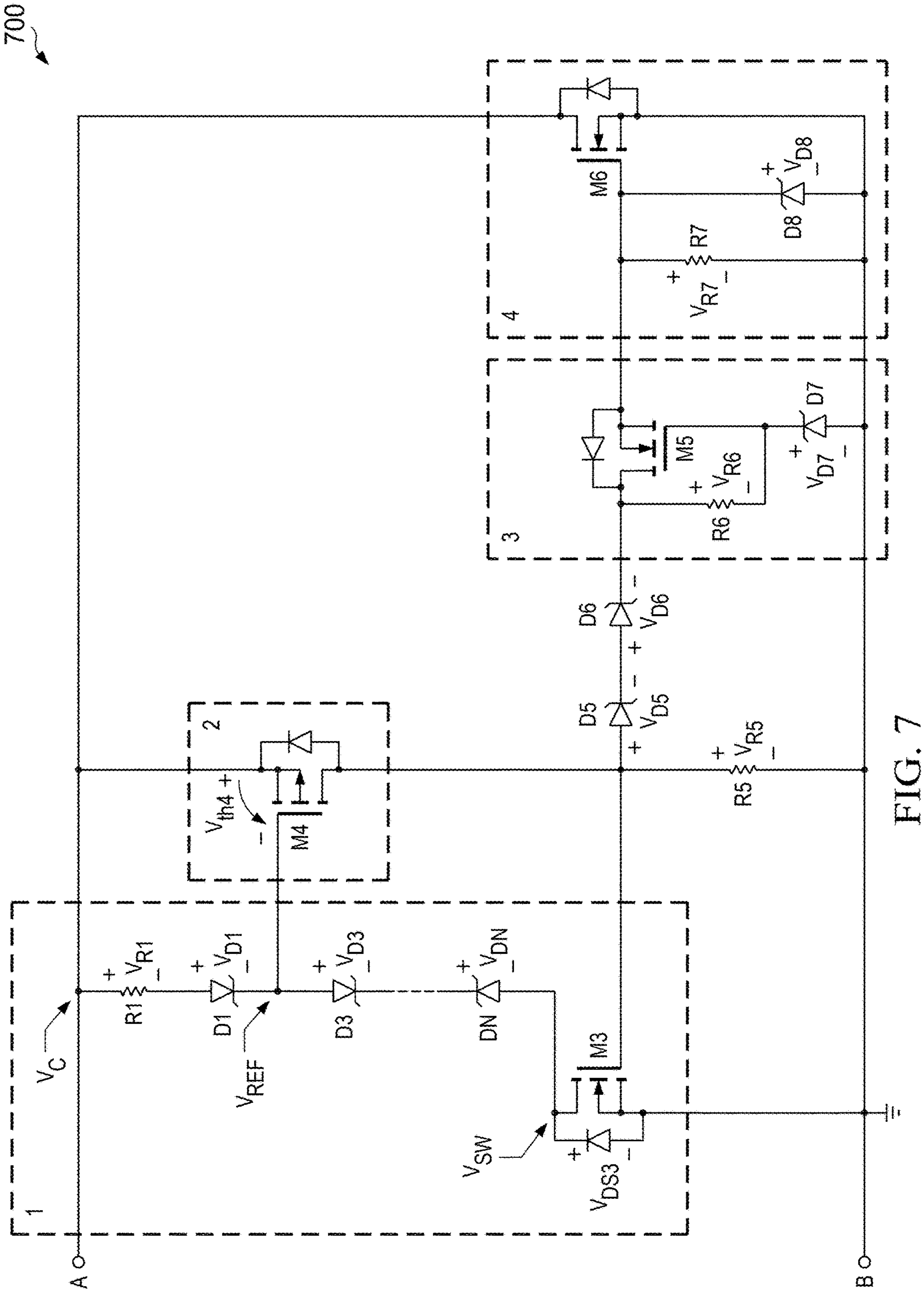
FIG. 7 is a diagram of a circuit using a regular Zener string without a shunt nFET, in accordance with an example embodiment of the present disclosure.

FIG. 7 is a diagram of a circuit 700 using a regular Zener string without a shunt nFET, in accordance with an example embodiment of the present disclosure. Circuit 700 includes the first four functional blocks and omits the fifth functional block of the bypassing element. The first block is a programmable reference voltage circuit with a different configuration from the first block of circuit 500 and circuit 600. The second block and the third block have a configuration similar to the corresponding blocks of circuit 500 and circuit 600. The fourth block is a voltage clamping element that omits Z1, similar to that of circuit 600.

Figure 8:
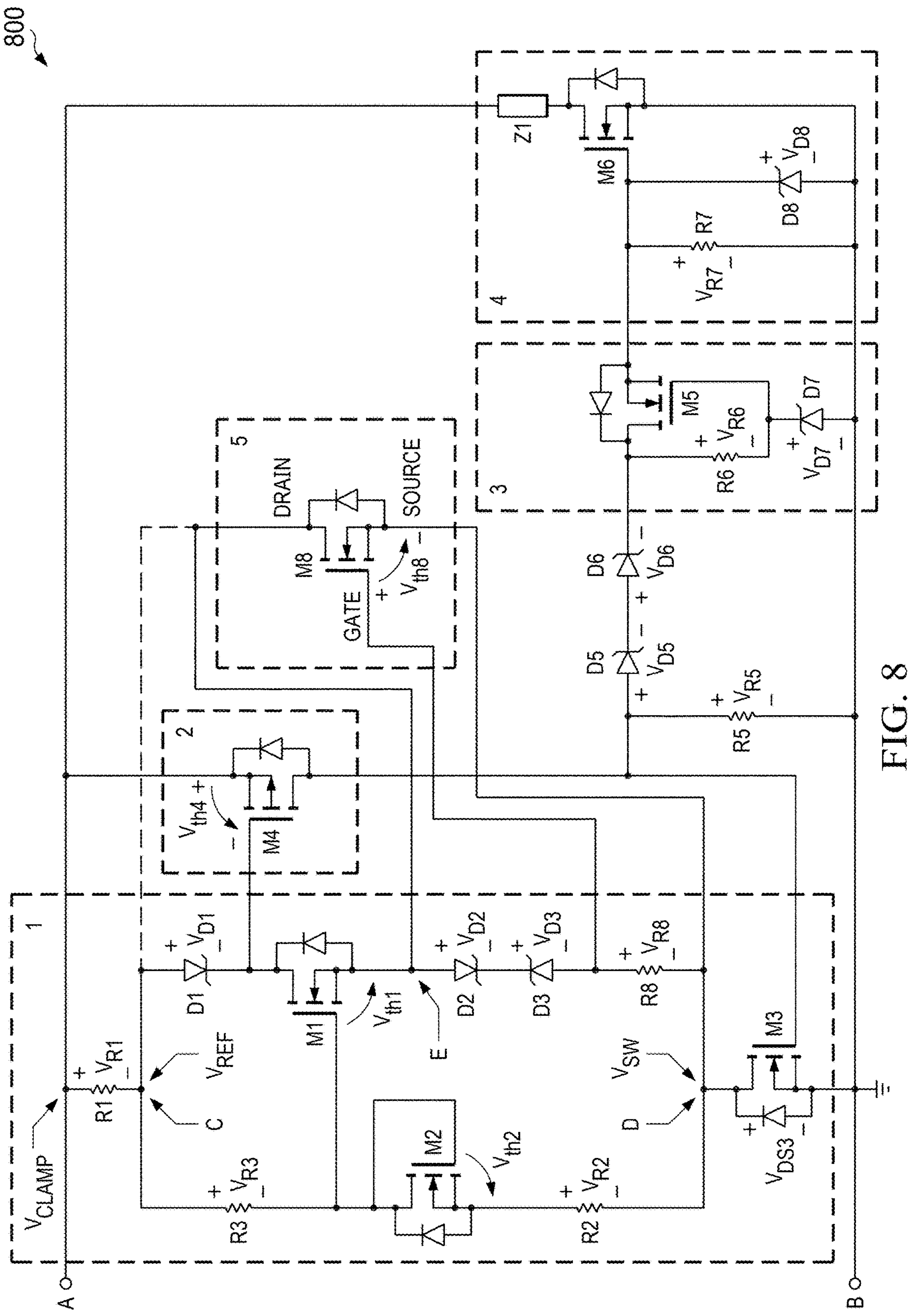
FIG. 8 is a diagram of a circuit using an nFET to generate a reference voltage and a small nFET at the bottom, in accordance with an example embodiment of the present disclosure.

FIG. 8 is a diagram of a circuit 800 using an nFET to generate a reference voltage and a small nFET at the bottom, in accordance with an example embodiment of the present disclosure. Circuit 800 is similar to the configuration of circuit 500 and uses the same control mechanism. The first block is a programmable reference voltage circuit that is different from those of circuit 500, circuit 600 and circuit 700. The second block and third block are similar to those of circuit 500, circuit 600 and circuit 700, and the fourth block differs from circuit 600 and circuit 700 by the addition of Z1, similar to circuit 500. The fifth block is a bypassing element that is similar to circuit 500, except with an nFET instead of a pFET.

Figure 9:
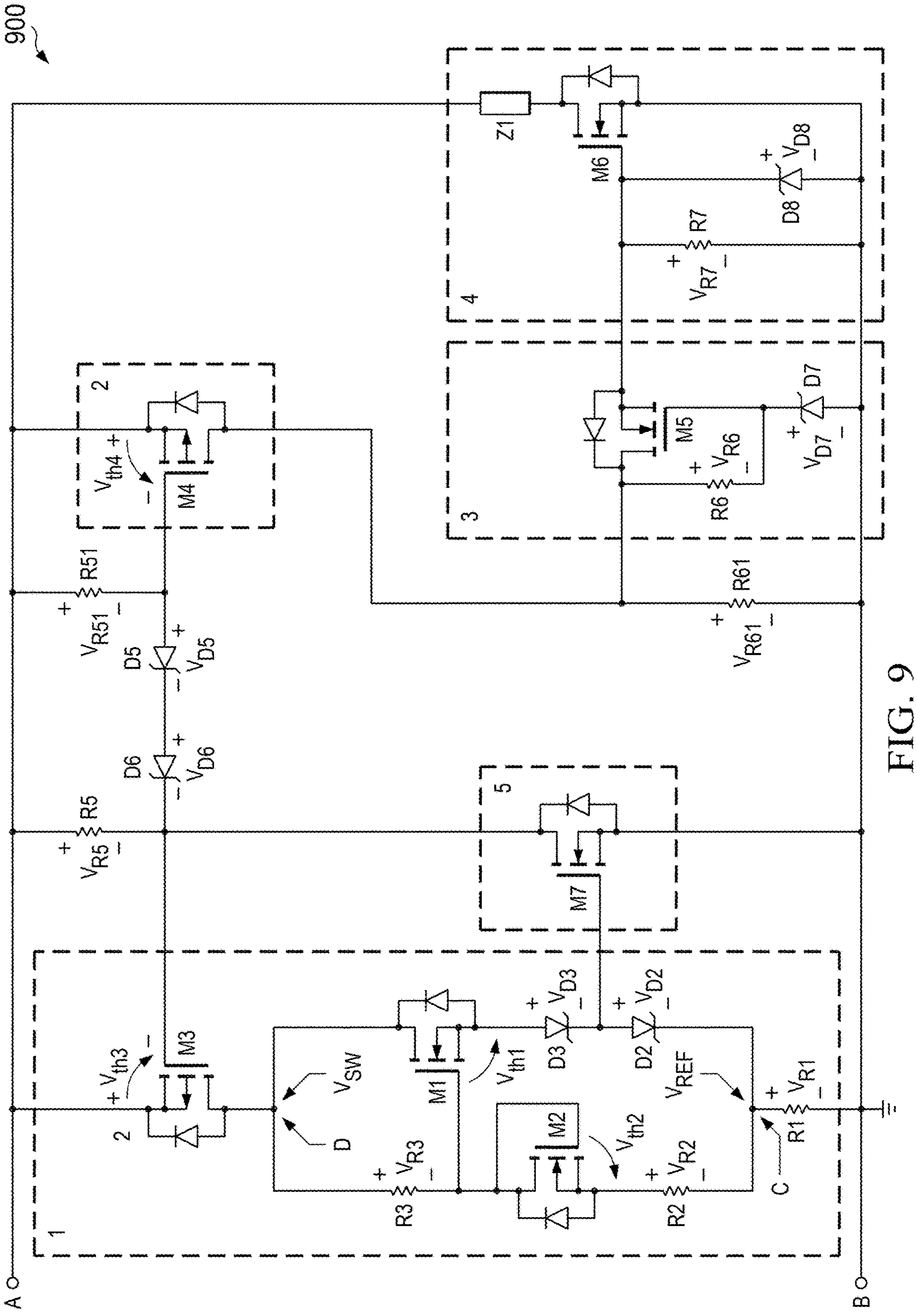
FIG. 9 is a diagram of a circuit using an nFET to generate a reference voltage and a small pFET on the top, in accordance with an example embodiment of the present disclosure.

FIG. 9 is a diagram of a circuit 900 using an nFET to generate a reference voltage and a small pFET on the top, in accordance with an example embodiment of the present disclosure. Circuit 900 is similar to the configuration of circuit 500 and circuit 800 and uses the same control mechanism.

Figure 10:
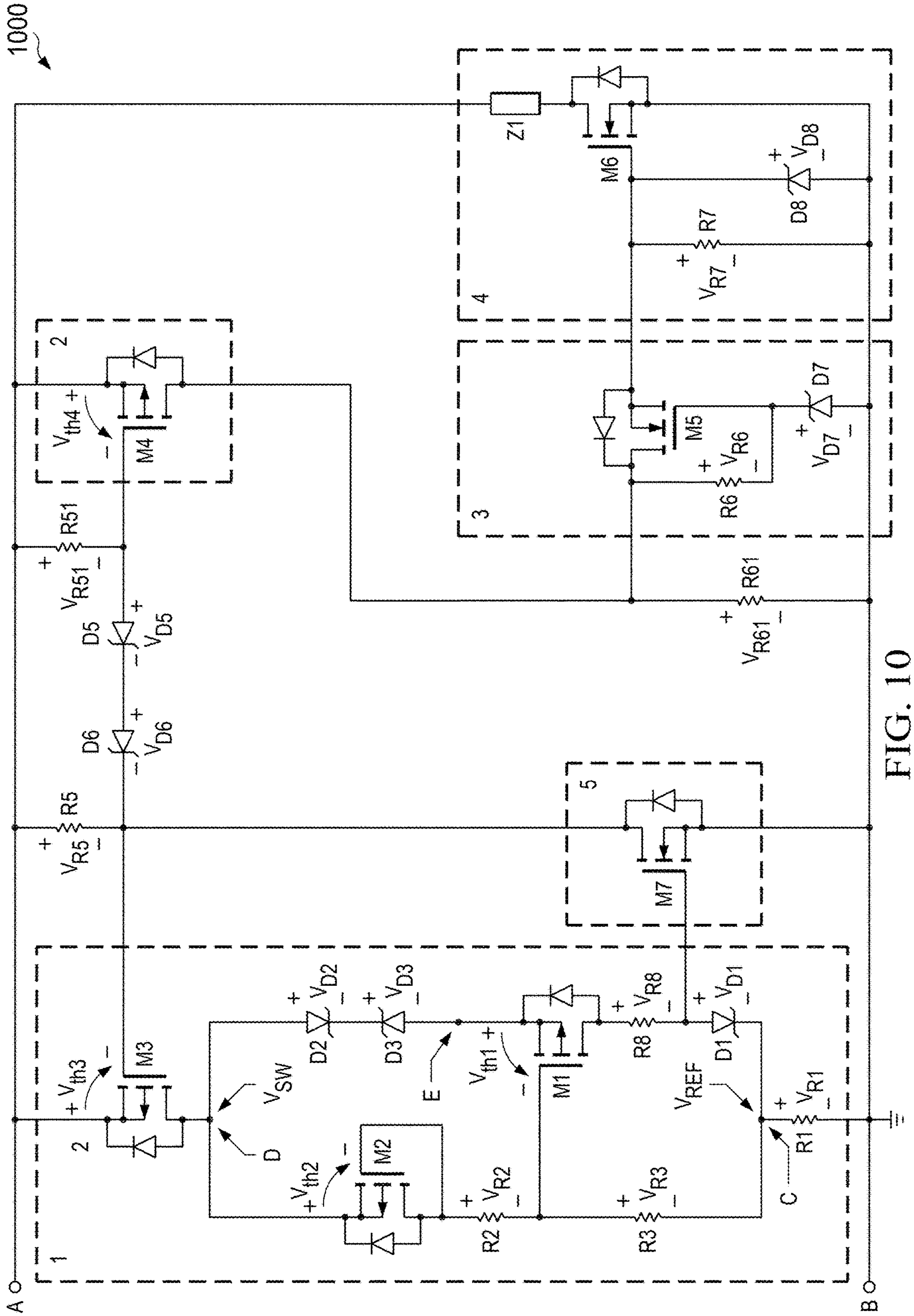
FIG. 10 is a diagram of a circuit using a pFET to generate a reference voltage and a small pFET on the top, in accordance with an example embodiment of the present disclosure.

FIG. 10 is a diagram of a circuit 1000 using a pFET to generate a reference voltage and a small pFET on the top, in accordance with an example embodiment of the present disclosure. Circuit 1000 is similar to the configuration of circuit 500 and circuit 800 and uses the same control mechanism.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A voltage protection circuit comprising:

a programmable reference voltage circuit configured to receive an input voltage and to generate a reference voltage;

an error amplifier stage coupled to the programmable reference voltage circuit;

a voltage limiting circuit coupled to the programmable reference voltage circuit and the error amplifier stage; and a voltage clamping element coupled to the programmable reference voltage circuit, the error amplifier stage and the voltage limiting circuit, wherein the programmable reference voltage circuit comprises a pFET.

2. The voltage protection circuit of claim 1 further comprising a bypassing element coupled to the programmable reference voltage circuit.

3. The voltage protection circuit of claim 1 wherein the error amplifier comprises a trans-conductance error amplifier.

4. The voltage protection circuit of claim 1 wherein the error amplifier comprises a trans-conductance error amplifier configured to convert an error voltage into current.

5. The voltage protection circuit of claim 1 wherein the error amplifier comprises a trans-conductance error amplifier configured to convert an error voltage into current and to the voltage clamping circuit.

6. The circuit of claim 1 wherein the voltage limiting circuit is configured to limit a maximum voltage at the voltage clamping element.

7. The circuit of claim 1 wherein the voltage clamping element is configured to bypass a surge current to ground during transient events.

8. The circuit of claim 2 wherein the bypassing element is configured to bypass an initial current spike.

9. The circuit of claim 2 wherein the bypassing element is configured to bypass an initial current spike flowing through a Zener diode and a second diode.

10. The circuit of claim 2 wherein the bypassing element is configured to bypass an initial current spike flowing through a Zener diode and a second diode of the programmable reference voltage circuit.

11. A voltage protection circuit comprising:

a programmable reference voltage circuit configured to receive an input voltage and to generate a reference voltage;

an error amplifier stage coupled to the programmable reference voltage circuit;

a voltage limiting circuit coupled to the programmable reference voltage circuit and the error amplifier stage; and a voltage clamping element coupled to the programmable reference voltage circuit, the error amplifier stage and the voltage limiting circuit wherein the programmable reference voltage circuit comprises a pFET and a Zener diode.

12. A voltage protection circuit comprising:

a programmable reference voltage circuit configured to receive an input voltage and to generate a reference voltage;

an error amplifier stage coupled to the programmable reference voltage circuit;

a voltage limiting circuit coupled to the programmable reference voltage circuit and the error amplifier stage; and a voltage clamping element coupled to the programmable reference voltage circuit, the error amplifier stage and the voltage limiting circuit, wherein the programmable reference voltage circuit comprises a pFET, a Zener diode, a first series resistor and a second series resistor.

13. The circuit of claim 1, wherein the error amplifier stage comprises a pFET.

14. The circuit of claim 1, wherein the error amplifier stage comprises a FET and a diode.

15. The circuit of claim 1, wherein the voltage limiting circuit comprises an nFET.

16. The circuit of claim 1, wherein the voltage limiting circuit comprises a FET and a diode.

17. The circuit of claim 1, wherein the voltage clamping element comprises an nFET.

18. The circuit of claim 1, wherein the voltage clamping element comprises a FET and a diode.

19. The voltage protection circuit of claim 11 further comprising a bypassing element coupled to the programmable reference voltage circuit.

20. The voltage protection circuit of claim 12 further comprising a bypassing element coupled to the programmable reference voltage circuit.

* * * * *